July 14, 1964  E. F. EGGER  3,140,640
ROUTERSHAPER

Filed July 13, 1959  3 Sheets-Sheet 1

INVENTOR.
Edwin F. Egger
BY
T W Secrest

ATTORNEY

July 14, 1964   E. F. EGGER   3,140,640
ROUTERSHAPER
Filed July 13, 1959   3 Sheets-Sheet 2
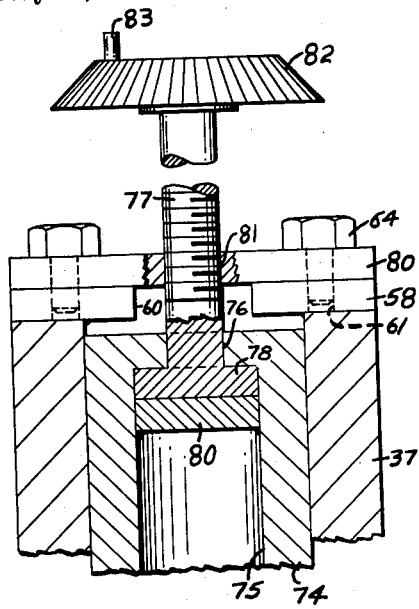
FIG._7
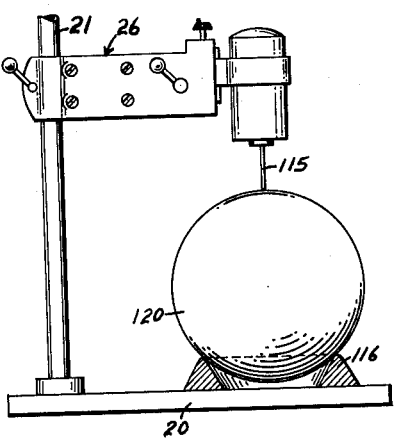
FIG._8
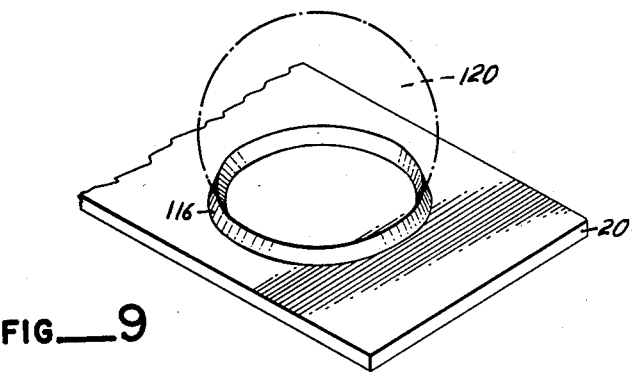
FIG._9
INVENTOR.
Edwin F. Egger
BY
TW Secrest
ATTORNEY July 14, 1964     E. F. EGGER     3,140,640
ROUTERSHAPER
Filed July 13, 1959                                       3 Sheets-Sheet 3
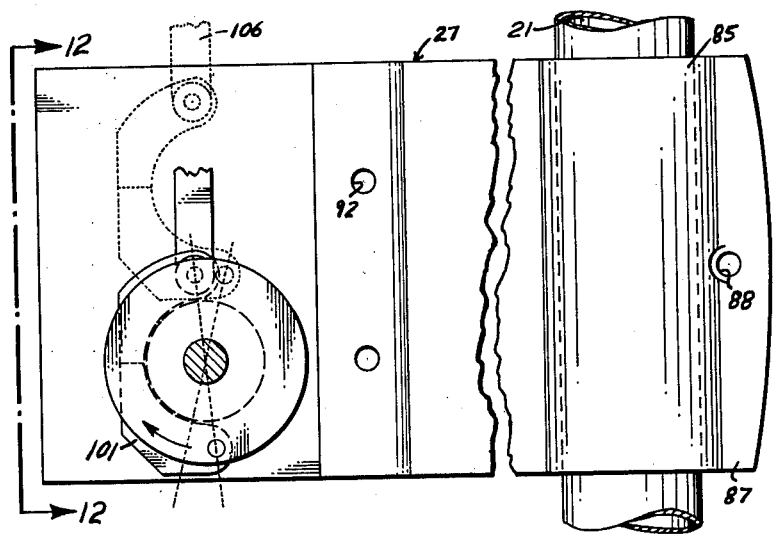
FIG—11
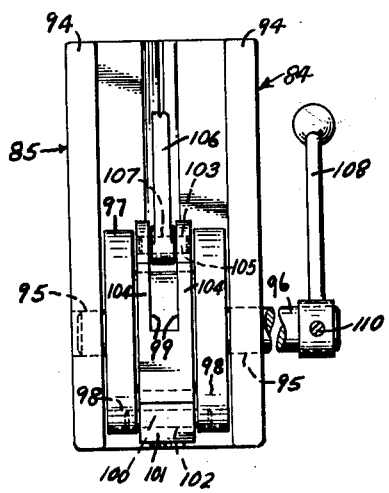
FIG—12
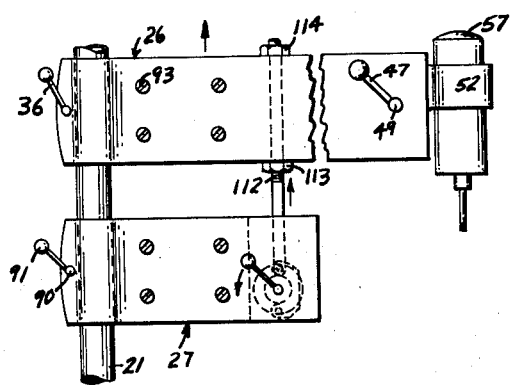
FIG—10
INVENTOR.
Edwin F. Egger
BY
T W Secrest
ATTORNEY

United States Patent Office 3,140,640
Patented July 14, 1964

3,140,640
ROUTERSHAPER
Edwin F. Egger, Shillshole and W. 46,
Seattle, Wash.
Filed July 13, 1959, Ser. No. 826,561
7 Claims. (Cl. 90—16)

This invention relates to a tool which may be used with equal facility as a router and as a shaper. In addition this invention includes a unique tool-positioning assembly for holding a power tool and also a new tool-raising assembly for raising and lowering the tool-positioning assembly away from and toward the object to be worked.

An object of this invention is the provision of a machine which can be used with equal facility as a router and as a shaper.

A further object is a provision of a new tool-positioning assembly which makes it possible to accurately position the tool with respect to the object being worked.

A further object is a provision of a tool-raising assembly and which assembly can raise and lower the tool-positioning assembly making it possible to realize the same depth of cut with the tool without tediously adjusting the position of the tool.

A still further and useful object is a provision of a tool for finishing a substantially spherical object so as to impart a smooth finish thereto.

Another important object of this invention is the provision of a tool-positioning assembly and a tool-raising assembly which are inexpensive to manufacture as they employ readily commercial available pieces of equipment.

These and further objects and advantages will be more clearly brought forth with reference to the drawings, specification and the claims.

Figure 3:
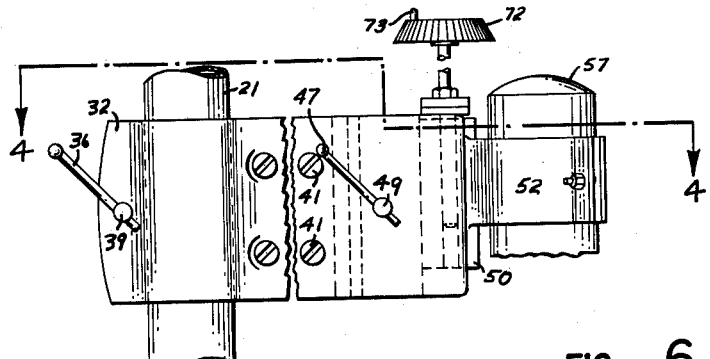

FIGURE 3, on the enlarged scale, is a fragmentary side elevation view of the tool-positioning assembly for holding the tool in operating position.

Figure 4:
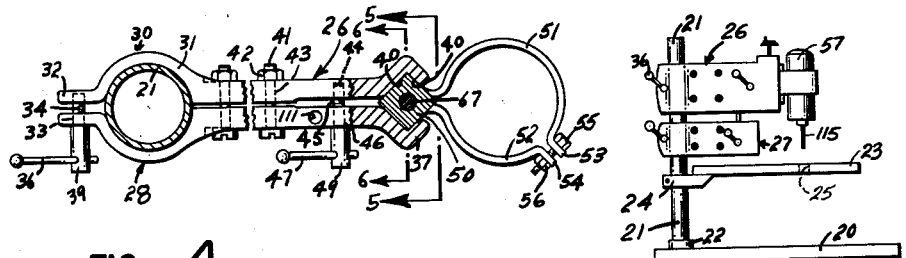

FIGURE 4 is a fragmentary plan view, partially looking down on the tool-positioning assembly and partially in section of the tool-positioning assembly, and is taken on line 4—4 of FIGURE 3.

Figure 5:
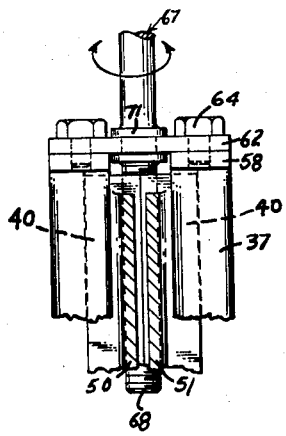
Figure 2:
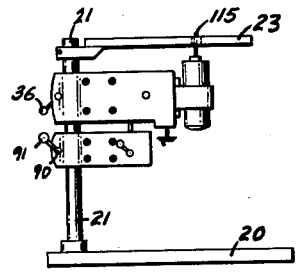
FIGURE 2 is a side elevation view of the invention employed as a shaper.

FIGURE 5, on an enlarged scale, is a fragmentary elevational sectional view taken on line 5—5 of FIGURE 4 and depicts the movable block in the jaws of the tool-positioning assembly.

Figure 6:
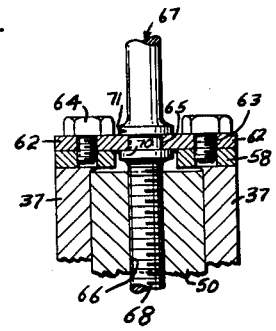

FIGURE 6 is a fragmentary vertical sectional view taken on line 6—6 of FIGURE 4 and illustrates the screw in the block for raising and lowering the same.

FIGURE 7 is a fragmentary vertical sectional view illustrating another species of the screw and movable block combination for raising and lowering the block.

FIGURE 8, on a reduced scale, is a side elevational view illustrating the combination of a support stand, the tool-positioning assembly and a positioning ring for finishing a bowling ball.

FIGURE 9, on an enlarged scale, is a fragmentary perspective view looking down on a bowling ball, in phantom, being held in position by a ring on the support stand.

FIGURE 10 is a fragmentary side elevational view of the tool-positioning assembly and the tool-raising assembly.

FIGURE 11, on an enlarged scale, is a fragmentary side elevational view of the inner face of one-half of the tool-raising assembly and illustrates two positions of the U-link i.e., the lower position and the upper position; and, FIGURE 12 is a front end elevational taken on line 12—12 of FIGURE 11 and illustrates the U-link in a lowered position.

Referring to the drawings it is seen that the invention comprises a base 20 and an upright tubular supporting stand 21 attached to said base by means of a collar 22. On this upright supporting stand is a work table or work bench 23 attached to the tubular stand 21 by means of a collar 24. In the work table 23 is an opening 25. On the tubular stand is positioned the tool-positioning assembly 26 and a tool-raising assembly 27.

The tool-positioning assembly 26 comprises two clamping leaves 28 and 30. The clamping leaves are substantially identical in construction. Each leaf comprises a substantially semi-circular section 31 for cofitting with tubular stand 21. On one end of this semi-circular section 31 is a lip 32. In the lip of the leaf 28 is a hole 33 and in the lip of the leaf 30 is a tapped hole 35 to receive a threaded shaft 34. This shaft on the outer side of the lip 32 on leaf 28 enlarges into shaft 39 so as to present a shoulder for abutting against the lip. Attached to the shaft 39 is a handle 36. This construction is well-known in the art and does not form part of this invention. As is readily realized, this handle may be rotated to force together the two lips so as to clamp the tool-positioning assembly firmly on the tubular stand 21. On that end of the semi-circular section 31 and opposite to the lips 32 are the jaw members 37. These jaw members protrude outwardly from each other and then inwardly toward each other. The inner faces of these jaw members are milled so as to have a V-groove 40 therein. The two surfaces of the V-groove 40 are substantially at 90°. The leaves are held together by means of bolts 41 and nuts 42. The bolts project through passageways 43 in the shanks of the two jaws. The jaws 37 are clamped together by means of a shaft 45. In the leaf 30 is a tapped hole 44 and aligned with this hole is a hole 46 in the leaf 28. The threaded shaft projects through the hole 46 and screws into the tapped hole 44. On the free side of the leaf 28, the shaft 45 enlarges into shaft 49 so as to present a shoulder for abutting against the leaf 28. On the free end of the shaft 49 is a handle 47. Again, this construction is well-known in the art and does not form part of this invention.

Between the jaws 37 is a movable block 50. This movable block in lateral cross-sectional configuration is substantially that of a square so as to present four faces at 90° to each other. This block 50 cofits in the V-groove in each jaw 37. Welded onto the movable block 50 are two bands 51 and 52. The band 51 has a lip 53 and the band 52 has a lip 54. A bolt projects through aligned openings in the lips 53 and 54 and threaded onto this bolt is a nut 56. These two bands 51 and 52 clamp the motor 57 or a power delivery means firmly in position. By releasing the jaws 37 so as to have a slight degree of play in them it is possible to move the movable block 50 and consequently the motor 57. This movement is accomplished by means on the upper end of the jaws 37. There is welded to the jaws a facing plate 58 having a central opening 60 therein and two tapped holes 61 on each side of the opening 60. Overlying this facing plate 58 are two semi-circular plates 62 having passageways 63 therein and which passageways 63 are aligned with tapped openings 61. Screwed into the tapped opening 61 are two bolts 64. These two bolts firmly clamp the semi-circular plates 62 into position. These two semi-circular plates 62 in combination define a central opening 65.

Returning now to the movable block 50 the same has a longitudinal tapped passageway 66 therein. A shaft 67 having a threaded lower section 68 is screwed into the tapped passageway 66 in the movable block. This shaft 67 above the threaded section has two spaced-apart circumscribing shoulders 70 and 71 which are spaced apart a distance slightly greater than the thickness of the plate 62. These spaced-apart shoulders 70 and 71 function as a guide and in combination with the plate 62 firmly position the shaft longitudinally with respect to the jaws 37. However, by rotating this shaft 67 it is possible to move the movable block 50 longitudinally with respect to the jaws 37 so as to lower the motor or to raise the motor. On the upper end of the shaft 67 is a circular plate 72 having a handle 73 offset from the center thereof for ease of rotation of the shaft.

Another modification of a means for raising and lowering the movable block is depicted in FIGURE 7. In this species a movable block 74 is centrally drilled on its longitudinal axis to form a cylindrical cavity 75. At the other end of this block there is drilled a cylindrical longitudinal passageway 76 which is somewhat smaller in diameter than the cavity 75. A locking means for firmly positioning the shaft with respect to the block comprises a threaded shaft 77 having on its lower end a circular plate 78. The diameter of this circular plate is somewhat larger than that of the threaded shaft 77 and somewhat smaller than the diameter of the cylindrical cavity 75 so as to cofit with the cavity 75. Pressed into place over the circular plate 78 is a plug 80 for firmly positioning the shaft 77 and the plate in position in the movable block. Welded onto the upper ends of the jaws 37 is the plate 58 having circular opening 60 therein. On each side of this circular opening 60 is a tapped opening 61. Overlying this circular plate 58 is another circular plate 80 having a tapped central opening 81 therein. The tapped central opening 81 is aligned with the circular opening 60 and also the drilled hole 76 in the movable block 74. The threaded shaft 77 is screwed into this tapped opening 81. On the upper end of the threaded shaft 77 is a circular plate 82 having a handle 83 offset thereon for ease of rotation of the shaft 77. As is readily realized, it is possible to move the movable block 74 upwardly or downwardly between the jaws 37 by rotating the shaft 77 by means of the handle 83. In this particular instance, the shaft 77 moves with the block 74 so as to move longitudinally with respect to the jaws 37.

Referring now to the tool-raising assembly 27 it is seen that the same comprises two clamping leaves 84 and 85. These are substantially identical in structure and comprise a semi-circular shoulder for encasing and encompassing the stand 21. On one end of each of the leaves 84 and 85 is a lip 87. In the lips 87 of the two cofitting leaves are two aligned passageways 88 for receiving a shaft 90. On one end of this shaft 90 is a handle 91. One end of this shaft is seated in one leaf and the threaded part of the shaft is screwed into the tapped passageway in the other leaf so that upon rotating the shaft it is possible to force together the two lips to tighten the tool-raising assembly on the support stand. This mechanism is the same as for shaft 34 in lips 32. Again, this mechanism is old in the art and does not form part of this invention. In the broad flat part of the leaves 84 and 85 are a series of passageways or holes 92 in which are bolts 93. On the other end of the bolts are nuts (not shown) making it possible to clamp the leaves 84 and 85 together. Near the outer edge of these leaves 84 and 85 the leaves expand outwardly or spread away from each other to form supporting plates, 94. In the lower parts of these plates 94 are two drilled aligned holes 95. Positioned in these holes 95 is a shaft 96. In a spaced-apart relationship on this shaft 96 are two circular plates 97. In each of these circular plates 97 is a drilled hole 98. These two drilled holes are aligned. Positioned in these holes 98 and running therebetween is a pin or shaft 100.

Positioned on the shaft 100 is a U-link 101 which runs through an arc of at least 180°. In the lower end of this link is a drilled passageway 102. The pin 100 runs through this drilled passageway 102 so as to position the U-link 101 between the two circular plates 97. The upper half of the interior of the link is cut away so as to form a recess 99 with fingers 104 on each side. Near the outer end of these two fingers, and in each arm is a drilled hole 103. The two holes 103 are aligned. Positioned in these passageways 103 is a pin 105. A linkage 106 having a drilled passageway 107 in the lower part is connected to the U-link 101 by means of the pin 105 running therethrough.

On the outer and free end of the shaft 96 is a handle 108 positioned thereon by means of a set screw 110.

The linkage 106 comprises a rod which connects with the tool-positioning assembly 26. This rod 106 passes through a drilled passageway 111. The upper part of the linkage 106 is threaded at 112 and a nut 113 is positioned on the shaft on one side of the clamping leaf 28 and a nut 114 is positioned on the shaft on the other side of the clamping leaf 28 so as to firmly position the linkage with respect to the clamping leaf.

It is possible by turning the handle 108 to rotate the shaft 96 and the circular plates 97 so as to move the U-linkage 101 either downwardly or upwardly. If the U-linkage is moved downwardly then it is rotated so as to go from one side of dead center of the shaft 96 to the other side, see FIGURE 11. In this manner the U-linkage is locked in position so that it cannot rotate farther around the shaft 96. In other words a lower downward locked position of the linkage is determined. Conversely, if the U-linkage is moved upwardly the pin 98 goes from one side of dead center on the upward stroke to the other side so as to lock the U-linkage against further rotation, and which rotation would rotate downwardly so as to lower the linkage 106.

Figure 1:
FIGURE 1 is a side elevation view of a specific embodiment of the invention constructed in acordance with the preferred teachings thereof, and which is depicted as being employed as a router.

By means of the tool-positioning assembly 26, it is possible to accurately determine and position the tool for the depth of cut in routing, see FIGURE 1. By means of the tool-raising assembly 27 it is possible to quickly remove the cutting tool from the object being worked, move the object to a new position and to lower the tool for further work. More particularly, the object to be routed is placed on the worktable 23 and the depth of cutting approximated. Then the handle 91 is rotated to lock the tool-raising assembly in a definite position on the stand. The handle 108 is rotated downwardly to bring the cutting tool 115 in an approximate working position with respect to the material to be worked. The handle 73 is rotated so as to adjust the height of the cutting tool 115 to the desired height. Then, the handle 47 is rotated so as to lock the movable block 50 firmly in position between the jaws 37. The handle 36 for firmly positioning the leaves on the support is not rotated so as to leave the lips 32 spaced fairly well apart so that the tool-positioning assembly 26 is free to be moved up and down on the tubular stand 21. The handle 108 on the tool-raising assembly is rotated to raise the cutting tool 115 out of the path or way of the object to be routed and the object to be routed is placed in position. Then the handle 108 is rotated to bring the cutting tool down onto the object. This cutting tool cuts into he material at the specified depth. When it is desired it is possible to quickly take the cutting tool out of the material by rotating the handle 108 to raise the cutting tool.

If it is desired to use this machine as a shaper, then the tool-positioning assembly, tool-raising assembly and the workbench 23 are removed from the tubular stand 21. The tool-positioning assembly and the tool-raising assembly are placed on the tubular stand and then the workbench 23 placed on the tubular stand above these two assemblies. The motor is turned upside down so that the cutting tool 115 or the shaping tool 115 is projecting through the opening 25 in the workbench 23.

Again, the adjustment for the depth of cut for the position of shaping tool 115 is determined by the fine adjustment of the handle 73 on the tool-positioning assembly. Then the tool-positioning assembly is moved away from the workbench by means of rotating the handle 108. The object to be worked is placed on the workbench and the handle 108 rotated so as to raise the cutting tool 115 to the proper position.

It is seen from this brief description that it is possible to use this machine both as a router and as a shaper. Also, by means of a tool-positioning assembly it is possible to readily remove the cutting tool away from the object to be worked. Furthermore, fine adjustment of the depth of the cutting tool or the positioning of the shaping tool can be achieved by means of the tool-positioning assembly with the movable block 50 and the jaws 37.

It is possible by means of this tool-positioning assembly 26 and a ring 116 on the base 20 to surface-finish objects having a substantially spherical configuration. More particularly, a ring or support having a supporting edge in a substantially circular configuration circle is positioned on the base 20 of the machine. The ring 116 on its upper surface or supporting edge defines a circle of less diameter than the diameter of the substantially spherical object to be surface-finished. This is particularly useful in the finishing of a bowling ball. For example, in bowling it is desirable to drill finger openings or finger stalls in the ball for ease of gripping. Many times it is necessary to fill in the finger openings as the openings are not properly positioned. A compound such as a rubber base compound is used to fill in these finger openings. Due to the physical properties of this rubber compound and the fact that the compound contracts upon drying or shrinks upon drying, it is necessary to overfill the finger openings. Naturally, with the overfilling of the finger openings when the material has dried, there is left an excess or a gob of the dry material on the surface of the bowling ball. In order to use the bowling ball it is necessary to refinish the surface of the ball at this particular area. In order to do this, I employ a high-speed motor having a speed of about 20,000 r.p.m. or greater per minute. In conjunction with the motor there is employed a cutting tool 115. This cutting tool may have a cylindrical tip or may even have a flat tip. At these high speeds with my apparatus the configuration of the tip is not of critical importance. Referring to FIGURE 8, the handle 36 of the tool-positioning assembly is rotated so as to firmly position the tool-positioning assembly 26 on the stand 21. Then the handle 73 is rotated so as to move the movable block between the jaws 37 and to lower the cutting tool 115 to close approximation to or just touching the surface of the bowling ball 120. The jaws are then clamped onto the movable block 50 or 74. By rotating the bowling ball on the support or circle 116 and because of the high speed of the cutting tool it is possible to remove this excess filling compound. Actually, if the bowling ball had been scratched badly at sometime so as to have a marred surface, it is possible to refinish the entire surface just by moving and rotating the bowling ball with the hands on this raised circle.

Having presented my invention it is seen that the same may be used as a router, a shaper, or as a finishing tool for substantially spherical objects.

What I claim is:

1. A tool-raising assembly for raising and lowering a connecting linkage, said assembly comprising a support member, a rotatable guide in said support member, a U-link, said U-link being connected to said rotatable guide in an off-center position, said connecting linkage being connected to said U-link, and means to rotate said rotatable guide on the downward stroke from one side of dead center to the other side of dead center so as to lock the U-link in a downward position and to rotate said rotatable guide on the upward stroke from one side of dead center to the other side of dead center so as to lock the U-link in an upward position.

2. The combination of a tool-positioning assembly and a tool-raising assembly, said positioning assembly comprising two spaced-apart jaws, each jaw having an inner face facing the other jaw, each jaw having a V-shaped groove in its inner face, a movable block, said block having two sets of two faces, the two faces in each set meeting in a ridge for cofitting with the V-shaped groove in the inner face of each jaw, a holding means associated with the moving block, means to move the movable block in the jaws, said raising assembly comprising a support member, a rotatable guide in said support member, a U-link, said U-link being connected to said rotatable guide in an off-center position, a connecting linkage being connected to said U-link, and said connecting linkage connecting with the positioning assembly.

3. A router, said router comprising in combination a support stand, a workbench, a tool-positioning assembly on said stand, and a tool-raising assembly on said stand, said positioning assembly comprising two spaced-apart jaws, each jaw having an inner face facing the other jaw, each jaw having a V-shaped groove in its inner face and aligned with the groove in the other jaw, said groove defining substantially a 90° angle, a movable block, the lateral cross-sectional configuration of the block being substantially a square for cofitting with the V-shaped grooves, a holding means associated with the block for positioning a motor, and means to move the block in the jaws, said raising assembly comprising a support member, a rotatable guide in said support member, a U-link, said U-link being connected to said rotatable guide at a position other than the axis of rotation, a connecting linkage pivoted to said U-link, said connecting linkage connecting with the positioning assembly, and the positioning assembly being positioned above the workbench.

4. A shaper, said shaper comprising in combination a support stand, a workbench, a tool-positioning assembly on said stand, and a tool-raising assembly on said stand, said positioning assembly comprising two spaced-apart jaws, each jaw having an inner face facing the other jaw, each jaw having a V-shaped groove in its inner face and aligned with the groove in the other jaw, said groove defining substantially a 90° angle, a movable block, the lateral cross-sectional configuration of the block being substantially a square for cofitting with the V-shaped grooves, a holding means associated with the block for positioning a motor, and means to move the block in the jaws, said raising assembly comprising a support member, a rotatable guide in said support member, a U-link, said U-link being connected to said rotatable guide at a position other than the axis of rotation, a connecting linkage pivoted to said U-link, said connecting linkage connecting with the positioning assembly, said workbench having an opening therein for receiving a shaping tool, and said positioning assembly being positioned below the workbench.

5. A surfacing machine for surfacing a substantially spherical object, said machine comprising in combination a support stand, a support member for the substantially spherical object, said support member presenting a support defining a circle, and a tool-positioning assembly on said support stand, said positioning assembly comprising two spaced-apart jaws, each jaw having an inner face facing the other jaw, each jaw having a V-shaped groove in its inner face and aligned with the groove in the other jaw, said groove defining substantially a 90° angle, a movable block, the lateral cross-sectional configuration of the block being substantially a square for cofitting with the V-shaped grooves, a motor, a holding means associated with the block for positioning the motor, and means to move the block in the jaws, a surface-finishing tool associated with said motor, and said surface-finishing tool being aligned with said support member to surface finish the substantially spherical object.

6. A tool-raising assembly for raising and lowering a connecting linkage, said assembly comprising two supporting plates, a rotatable shaft running between said supporting plates and supported by said plates, a rotatable guide connected to said shaft, a U-link having two legs, one of said two legs being pinned to the rotatable guide in an off-center position with respect to said shaft, the other one of said two legs connecting with said connecting linkage, and means to rotate said rotatable guide on the downward stroke from one side of dead center to the other side of dead center so as to lock the U-link in a downward position and to rotate said rotatable guide on the upward stroke from one side of dead center to the other side of dead center so as to lock the U-link in an upward position.

7. A tool-positioning assembly, said assembly comprising two spaced-apart jaws, each jaw having an inner face facing the other jaw, each jaw having a V-shaped groove in its inner face, a movable block, said block having two sets of two faces, the two faces in each set meeting in a ridge for cofitting with the V-shaped groove in the inner face of each jaw, a holding means associated with the moving block, a keeper bridging the jaws, a tapped opening in said keeper, a longitudinal opening in said movable block, said longitudinal opening being aligned with the tapped opening in the keeper, a threaded shaft threaded into the tapped opening in said keeper and projecting into the longitudinal opening, means to restrict the longitudinal movement of the threaded shaft with respect to the movable block, and means to vary the distance between the jaws so as to clamp the jaws against the movable block and thereby fixedly position the movable block with respect to the jaws.

References Cited in the file of this patent

UNITED STATES PATENTS

| | | |
|---|---|---|
| 207,207 | Rice | Aug. 20, 1878 |
| 549,573 | Letzkus | Nov. 12, 1895 |
| 979,006 | Howland | Dec. 20, 1910 |
| 1,700,795 | Hajos | Feb. 5, 1929 |
| 2,255,541 | Dremel | Sept. 9, 1941 |
| 2,363,115 | Brocklebank | Nov. 21, 1944 |
| 2,428,669 | Hopkins | Oct. 7, 1947 |
| 2,546,764 | McHose | Mar. 27, 1951 |
| 2,622,639 | Meyers | Dec. 23, 1952 |
| 2,905,211 | Weinstein | Sept. 22, 1959 |

FOREIGN PATENTS

| | | |
|---|---|---|
| 721,553 | Great Britain | Jan. 5, 1955 |